United States Patent
Meier et al.

[11] Patent Number: 5,835,252
[45] Date of Patent: Nov. 10, 1998

[54] DEVICE FOR GENERATING ANNULAR PICTURES

[75] Inventors: Ludwig Meier; Juergen Pudenz, both of Jena, Germany

[73] Assignee: Carl Zeiss Jena GmbH, Jena, Germany

[21] Appl. No.: 947,797

[22] Filed: Oct. 9, 1997

[30] Foreign Application Priority Data

Oct. 9, 1996 [DE] Germany ......................... 196 41 656.6

[51] Int. Cl.$^6$ .................................................. G02B 26/08

[52] U.S. Cl. ......................... 359/201; 359/202; 359/204; 359/216

[58] Field of Search ..................................... 359/201–205, 359/208, 212, 216–219, 641, 726–731; 347/225, 232, 233, 236, 243, 244, 246, 253, 254, 258–261; 348/98–100, 108–109, 201, 203; 358/474, 493

[56] References Cited

U.S. PATENT DOCUMENTS

| | | | |
|---|---|---|---|
| 3,647,956 | 3/1972 | Buck et al. | 359/201 |
| 3,669,522 | 6/1972 | Anderson | 359/208 |
| 5,416,630 | 5/1995 | Ito et al. | 359/208 |
| 5,546,214 | 8/1996 | Black et al. | 359/203 |
| 5,557,438 | 9/1996 | Schwartz et al. | 359/204 |

*Primary Examiner*—James Phan
*Attorney, Agent, or Firm*—McAulay Nissen Goldberg Kiel & Hand, LLP

[57] ABSTRACT

A device for generating a partial annular or an annular picture on a portion of a spherical projection surface by an annular mirror by which a light bundle generating this picture can be deflected onto the projection surface has a light source by which substantially parallel light bundles can be generated, a control unit for controlling the intensity of the light bundle, and a raster scanning device which is arranged in the light path between the annular mirror and the light source and which can raster scan the light bundle in two dimensions for the sequential illumination of picture points of the annular picture or partial annular picture.

12 Claims, 5 Drawing Sheets

DEVICE FOR GENERATING ANNULAR PICTURES

BACKGROUND OF THE INVENTION a) Field of the Invention

The invention is directed to a device for generating an annular or partial annular picture on a portion of a spherical projection surface by means of an annular mirror by which a light bundle generating this picture can be deflected onto the projection surface.

b) Description of the Related Art

Such devices are known from DD-PS-208 880. This reference shows a panorama projection device for a planetarium which has an illumination device for illuminating a slide or transparency followed in the light propagation direction by an objective lens and an annular mirror lens. The annular mirror lens is formed by a hyperboloid surface which reflects on the side remote of the objective lens. The transparency is projected onto the dome of the planetarium as a panorama by the hyperboloid surface. The hyperboloid annular mirror thus images a circular ring on the flat transparency in an annular spherical segment on the dome of the planetarium.

Because of the geometrical impossibility of transferring a plane surface to a curved surface with a true conformity of angles and a true conformity of surfaces, the image on the transparency must be represented in a distorted manner in relation to the image projected onto the dome of the planetarium. However, since an annular picture on the transparency is imaged again in a partial segment of the planetarium dome defined by parallel circles, a picture distortion on the transparency must be taken into account in this technical solution exclusively in the radial direction for a geometrically correct picture projection on the dome.

According to this prior art, however, only limited small surfaces can be illuminated, since otherwise an appropriate light intensity for the image represented on the dome would result in excessive thermal loading on the transparency, which would quickly destroy this transparency.

Therefore, the known device could only be used to image panoramas. Other possibilities for imaging in a dome, for example, displaying a film on the dome showing a rendezvous between two spacecraft, could not be realized with a device of this type. The main problems are the great complexity involved in preparing the image contents in a suitably distorted representation and simultaneously reducing the anticipated thermal loading in the image area.

OBJECT AND SUMMARY OF THE INVENTION

Therefore, it is the primary object of the invention to generate a panorama picture with a greater image surface than that generated by the panorama projector known from the prior art while avoiding a high thermal loading in the image plane. In particular, the image distortions which always occur when imaging in a plane in a dome can be taken into account in a simple manner so that longer films can also be projected onto the dome by this panorama projector.

Based on the prior art indicated in the beginning, this object is met by providing a light source by which substantially parallel light bundles can be generated and a control unit for controlling the intensity of the light bundle, and a raster scanning device which is arranged in the light path between the annular mirror and the light source and which can raster scan the light bundle from left to right, top to bottom and line by line for the sequential illumination of picture points of the annular picture.

The solution according to the invention accordingly returns to the period of inception of television when there were still no picture tubes and image generation by means of scanning light bundles with mirror wheels and control of the intensity of these light bundles were viewed as a substantial improvement over the initially employed Nipkow disks. Although this technique has been known for a very long time, its use in planetaria and especially for the indicated device for generating annular pictures was not envisaged.

This projection technique requires neither a transparency nor a film, so that no thermal loading at all occurs as the result of absorption in an image plane. Therefore, no effort need be expended on cooling a film.

Further, the intensity of the picture points can be controlled in a simple manner. The image can advantageously be programmable so that there is no need for special preparations of films for a corrected or rectified display on a dome. The desired distortion of the primary image contents is then taken into account by processing before controlling the individual picture points. Since a corresponding image processing need only be effected in the radial direction when projecting panorama pictures by means of an annular mirror, this can be accomplished within an acceptable time period by currently available computers. The time required for processing can even be reduced when the video display is effected by means of a computer using known data compression techniques. For example, the distorted picture can be stored in a memory or storage from which the picture contents to be displayed on the screen can always be read out periodically. For displaying a video film, the speed of conventional processors is sufficient for recalculating only the picture points which change during movement and consequently for changing the storage contents.

Due to the possibility for simple rectification, it is also not necessary to rely on a hyperboloid mirror surface in the case of the annular mirror as is known in the prior art. Because of the simpler image processing, optional shapes can be used for the annular mirror in the device according to the invention.

According to a preferred further development of the invention, it is particularly advantageous, however for different reasons, that the annular mirror is a partial surface of a hyperboloid. Thus, approximately identical light intensities per surface unit are achieved at various locations of the dome. Although different light intensities could also be taken into account for the image processing for rectification in the control unit, other surfaces which would lead to an extremely uneven illumination density at different locations on the dome result in a sharply elevated intensity in some areas of the dome surface and in a highly attenuated intensity in other areas, so that, at the same light density, light sources with substantially higher output would have to be used in which only a portion of the output would be made use of. The reasons for preferring a hyperboloid as an annular mirror are based substantially on considerations of electronics which played no part in DD 20 88 80.

In accordance with another preferable further development of the invention, an optical system for parallelizing or focussing on the projection surface the light bundle proceeding from the annular mirror is provided between the raster scanning device and the annular mirror.

In general, an uneven beam expansion is anticipated in the case of reflection at an annular mirror. This is undesirable since uniformly good picture reproduction is desired as far as possible in all areas of a spherical projection surface on which the annular picture is to be generated. By providing an optical system, the different beam expansions can be compensated based on the reflection of the light bundle at the annular mirror.

However, this further development offers still other advantages. The optical system is provided in this instance for parallelizing or focussing the light bundle proceeding from the annular mirror. The focussing is advisable principally in the case of a device arranged in the center of the dome, so that a sharper image is generated. However, in the interest of space, it may be more advantageous to arrange the device outside of the center of the dome, since a star projector is normally arranged in the center for projection of the star sky on the planetarium dome. A parallelizing of the light bundle is then advantageous, since different points at the circumference of a parallel circle lie at different distances from the dome in this arrangement. Thus, with parallel light beams, substantially the same resolution is advantageously achieved in every picture point of the annular or partial annular picture.

In another preferred further development of the invention, the annular mirror is constructed on an annular mirror lens associated with the optical system on the side remote of the raster scanning device.

According to this further development, the light bundle must first pass through the lens before it is reflected. Because of the deflection of the light bundle provided by the additional lens, corrections of imaging errors can be taken into account which enable an improved picture quality for parallelizing or focussing. Above all, this also makes it possible to use surfaces other than hyperboloid surfaces, since the deflection behavior of the optical system is now determined additionally by the lens and not only by the mirroring or coating.

In particular, it has proven advantageous with respect to manufacturing technique as well as with respect to astigmatism corrections according to a preferred further development of the invention when the side of the annular mirror lens facing the raster scanning device is a spherical surface.

In principle, different optical systems could be used for focussing or parallelizing. However, difficulties can arise with respect to simultaneous correction of chromatic aberrations and distortion for purposes of optimization.

In this respect, its has been shown to be particularly advantageous that the optical system has two partial lens systems and the raster scanning device is arranged, by its area in which the light bundle can be deflected, in an entrance pupil of the first partial lens system, wherein the light bundle can be imaged by the first partial lens system in an intermediate image plane and the second partial lens system, together with the annular mirror, parallelizes the light bundles arriving from the intermediate image plane or focusses them on the projection surface.

As a result of this teaching, the optical systems mentioned above can be configured between the annular mirror and raster scanning device in a simple manner with conventional optics designers.

In another preferable further development of the invention, a plurality of light sources and a plurality of associated raster scanning devices for deflecting the light bundles emitted by these light sources are provided, and the entrance pupil comprises the areas in which the light bundles of the light bundles proceeding from the plurality of light sources can be deflected by the raster scanning devices.

In accordance with this further development, a plurality of light bundles is directed onto the dome by means of raster scanning devices. The plurality of light bundles increases the integrated light density on the dome; thus, more light-intensive pictures are generated. Accordingly, for example, partial pictures of the image to be projected can also be illuminated with different raster scanning devices or light bundles. The picture resolution which could otherwise be limited by the electronic switching speed is then increased in a simple manner. In this connection, it must be kept in mind that dome surfaces are normally very large; that is, for a good resolution, the number of picture points on a parallel circle must be substantially greater than in the lines of a television picture. Therefore, with very large domes and speeds of $\frac{1}{25}$ s per total image, the limits of electronic switching speeds for the individual picture points for good resolution are reached very quickly. This limitation is overcome in this further development of the invention in that every light source of the light sources associated with a plurality of scanning devices need only illuminate a partial surface of the desired annular picture.

The configuration of the entrance pupil required in this further development enables the imaging of the light bundles of different raster scanning devices with the same optics and the same mirrors, which is considerably more economical than different, independently operating projectors.

In particular, this can be realized economically in an advantageous manner in optical systems which, as was already described above, comprise two partial lens systems between which an intermediate image is generated, because in this embodiment form an angle generated by the raster scanning devices is imaged substantially independently from the location of the raster scanning device in the entrance pupil on the same location of this intermediate image plane. The effort expended on adjustment for combining individual partial images of the individual raster scanning devices in the entrance pupil is accordingly reduced.

With reference to a plurality of light bundles, the number of raster scanning devices can also be minimized when, in accordance with an advantageous further development of the invention, a plurality of light sources is provided, a raster scanning device has a rotatable polygon mirror for scanning which has a plurality of coated polygon sides for deflection, and the light bundles of different light sources are directed to a plurality of these polygon sides.

Because of this, a plurality of light bundles can be scanned with a single polygon mirror. According to the further development, this polygon mirror is arranged in the entrance pupil of the optical system in such a way that it is available for deflecting a plurality of light bundles for different images. Above all else, an outstanding synchroneity is produced in this way in an economical manner when different partial areas of the annular picture are illuminated by means of the plurality of light bundles.

In another advantageous further development of the invention, the optical system is color-corrected in the wavelength range from 520 nm to 670 nm. As was stated in the introduction, such systems are primarily suited to displaying panorama pictures in planetaria. In planetaria, the panorama is substantially the silhouette of a city which could be imaged in a simple manner in an individual wavelength because black-and-white images are generally sufficient for this purpose. However, because of this further development, it is also possible to show color pictures without chromatic aberrations. This not only offers the possibility of projecting color-true pictures on the wall of the dome, but also makes possible show applications in a planetarium or other dome projections.

In a manner analogous to the transparency mentioned above, the picture is only imaged on a ring, according to the invention, for example, in the intermediate image plane of the special optics described above. For optimization of output, it is particularly advantageous when, in accordance with a preferred further development of the invention, the raster scanning device has an annular scanner which raster scans the light bundle only within the annular region.

In contrast to polygon mirrors and swiveling mirrors which, in a fast picture display, produce a surface imaging as a result of their inertia, the annular mirror only detects the angular areas in which picture points are also to be shown in the displayed annular picture. In other cases, it is necessary to blank out unwanted scanned regions owing to the inertia of the mirror masses. This would mean that, in the time average, the output of the light bundle would not be available in its entirety for the picture to be imaged in the dome. This blanking out is dispensed with according to this further development. The required output for the light sources is thus reduced in an advantageous manner.

In accordance with another preferred further development of the invention, the control unit for controlling the intensity has an arithmetic unit, especially inside a computer, for preparing the image data for rectifying the annular picture shown by this device.

By means of the arithmetic unit it is possible to input optional pictures and to distort them in real time in such a way that the distortion produced on the projection surface as a result of the optics and the mirror is compensated for. Further, the pictures to be imaged can be retrieved rapidly from a fixed disk by the computer. Currently available possibilities of data compression and picture reproduction used for image processing are sufficient in a projection of several minutes length which is adequate for conventional planetarium operation to retrieve from a fixed disk the image contents to be projected onto a dome.

However, the fast preparation of the rectification by means of the arithmetic unit is also particularly advantageous. Thus, video data may be entered directly and suitably rectified by the computer in real time.

As was already made clear in the preceding, it is particularly advantageous when the light bundles used for imaging are parallel light bundles. For this reason, in a preferred further development of the invention, the light source has at least one laser.

The invention is explained more fully in the following with reference to the drawings.

DESCRIPTION OF THE PREFERRED EMBODIMENTS

Figure 1:
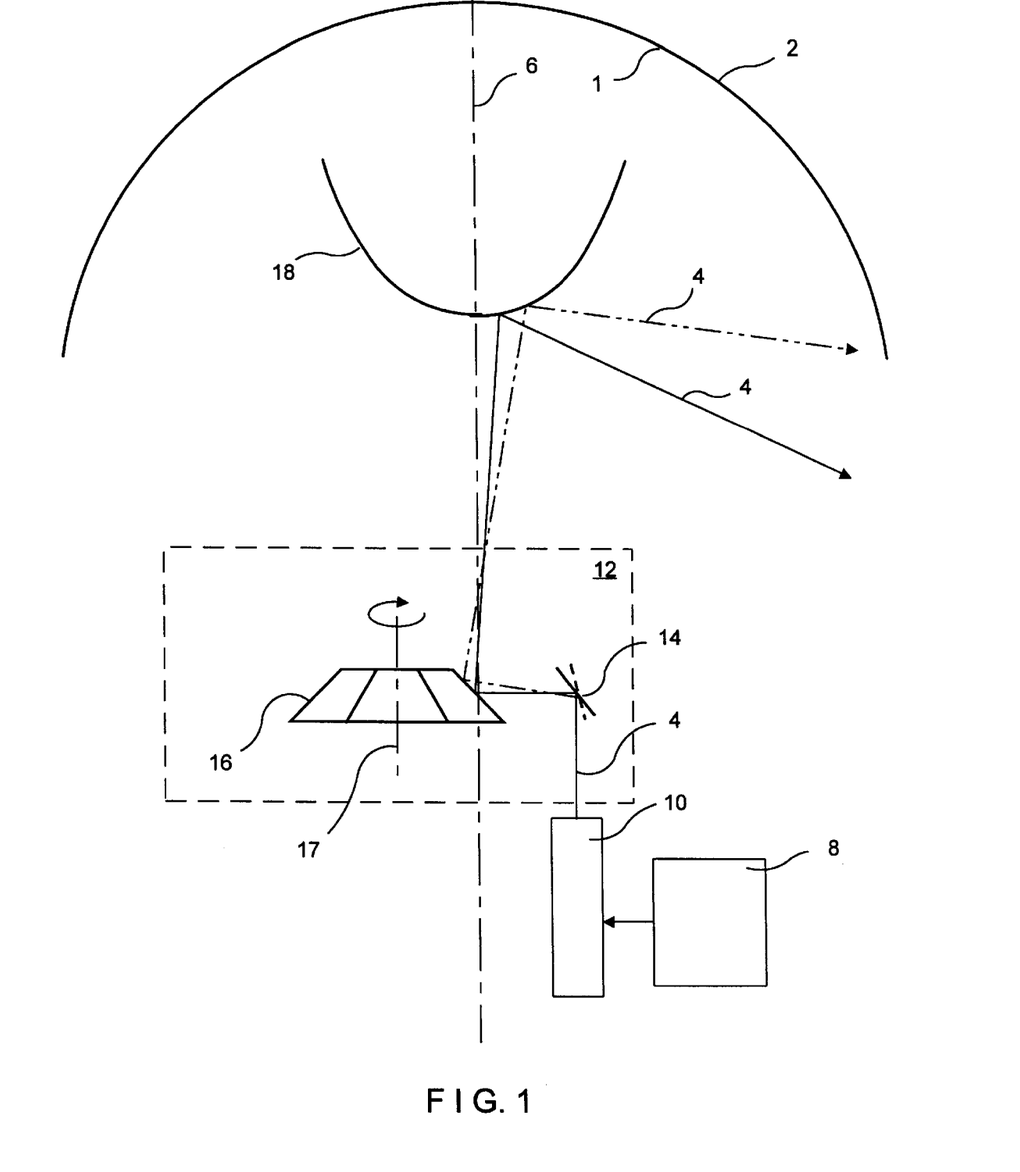
FIG. 1 is a schematic view illustrating the generation of an annular picture on a projection surface.

FIG. 1 is a schematic view of a device showing the essential parts of the invention. As is conventional in planetaria, the projection surface 1 is the inner side of a dome 2 which is illuminated by light bundles 4 for displaying an annular picture. The symmetry with respect to rotation in the schematic view in FIG. 1 is given by the optical axis 6.

The annular or partial annular picture on the projection surface 1, as is known in television, resolves into picture points which are illuminated sequentially by means of the light bundle 4 which is guided rapidly over the individual locations of the picture points. The sequential illumination is effected at high speed so that as a result of the eye's inertia a total picture can be seen. A control unit 8 serves to control the light intensity of the light bundle 4 and is connected to a light source 10 emitting the light bundle 4. The control unit 8 not only controls deflection, but also the intensity of the light bundle by which the respective illuminated picture point is illuminated. In particular, this control unit 8 distorts the video pictures which are received, for example, from a video input, so that these video pictures are reproduced on the dome in a geometrically faithful manner.

Only one light source 10 is shown in the embodiment example in FIG. 1. When color images are shown, three light sources with primary colors are used, the light bundle 4 being mixed from its light bundles. The light sources of different primary colors are then controlled separately by the control unit 8, so that the color as well as the brightness of the light bundle 4 can also be predetermined.

The light bundle 4 in the embodiment example shown in FIG. 1 is substantially parallel. Lasers are preferably used for this purpose as light sources. Three lasers whose different wavelengths reproduce the primary colors or which generate different wavelengths from the laser light by mixing are used for the color displays.

After being emitted from the light source 10, the light bundle 4 strikes the mirror of a raster scanning device 12 which, after the light bundle 4 passes through additional optical components, explained later, guides the light bundle 4 to latitude circles and longitude circles of the projection surface 1. Instead of mirrors, acoustooptical modulators can also be used, but these would not change anything in principle with the exception of the color corrections which would then be necessary.

A swiveling mirror 14 controlled for rapid reciprocating movement is used to deflect the longitude circles.

Two positions of the swiveling mirror 14 are shown in FIG. 1, wherein one is shown in a dashed line. The different light paths of the light bundles 4 for the two positions of the swiveling mirror 14, likewise shown in solid or dashed lines, can also be seen from FIG. 1. It is clear from the light paths shown in the figure that the light bundle 4 shown in dashed lines strikes the projection surface 1 at a different location on the dome 2 than the light bundle 4 shown in solid lines, depending on the position of the swiveling mirror 14.

After being reflected at the swiveling mirror 14, the light bundle strikes a side surface of a polygon mirror 16 which is constructed in the shape of a truncated cone in the embodiment example. The individual side surfaces of the polygon are coated and reflect the light bundle 4, but in different directions depending on the position of the swiveling mirror 14.

The polygon mirror 16 rotates about its axis 17. This results in a different reflection angle for the light bundle 4, so that this light bundle 4 is directed onto the dome 2 along latitude circles of the projection surface 1.

The light bundle 4 subsequently impinges on an annular mirror 18 which deflects the light bundle into the regions of the dome provided for the imaging of the partial annular picture. Because of the annular mirror 18, the angles available on the dome for displaying a picture are substantially increased.

The polygon mirror 16 is constructed in the shape of a truncated cone in this example. However, there is also a possibility for prism type polygon mirrors, whose axis of rotation can even lie vertically to the optical axis. The choice of design of the polygon mirror 16 and of the position of the axis of rotation 17 can generally be made in dependence on which areas of the dome are to be illuminated with the partial annular picture or the annular picture.

The annular mirror 18 can generally be curved in such a way that the picture area to be imaged on the projection surface 1 is configured in dependence on the angle area accessible to the light bundle 4 by the raster scanning device 12. However, it has been shown in optical calculations carried out by way of example that it is particularly favorable to construct the annular mirror 18 as a hyperboloid, since the astigmatism corrections are then particularly small because of the curvature of the annular mirror 18.

Figure 2:
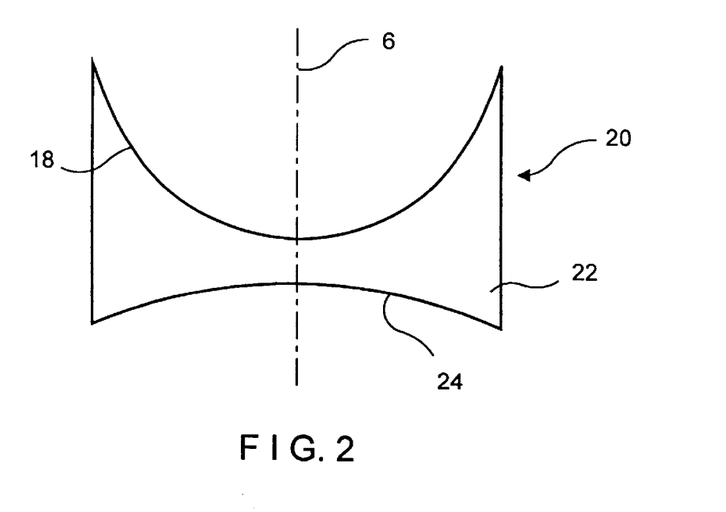
FIG. 2 shows a special embodiment form of an annular mirror on the surface of an annular mirror lens.

FIG. 2 shows a somewhat different embodiment form of the annular mirror 18 shown in FIG. 1 which is likewise advantageous for the correction of image errors. In this case, the annular mirror 18 is deposited by evaporation on the glass body 22 of an annular mirror lens 20. The glass body 22 likewise serves for the deflection of the light bundles 4. Its shape can be configured for astigmatism corrections depending on the curvature of the annular mirror 18. For the purpose of optimization, it has proven particularly advantageous, in the case of a hyperboloid mirror, to construct the uncoated side of the glass body 22 as a spherical surface 24.

Figure 3:
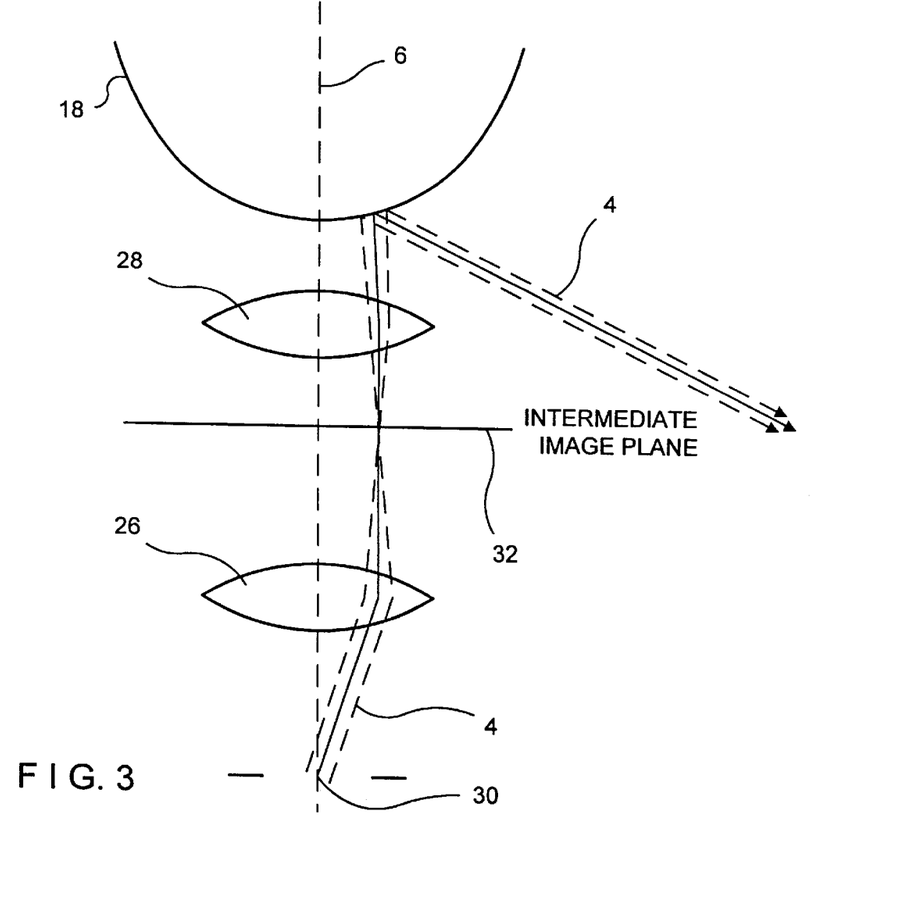
FIG. 3 is a schematic view of an advantageous optical system in which the light bundle impinging on the dome is parallel or focussed.

Another possibility for correcting for astigmatism is given in FIG. 3, which does not show an annular mirror lens but which can also be combined with the annular mirror lens of FIG. 2. Lenses which are physically separated from the annular mirror 18 are also used in this embodiment example for optical correction of the imaging.

For correction of astigmatism, the embodiment example in FIG. 3 uses an optical system comprising two partial lens systems 26 and 28. Because of its construction, chromatic errors of the optical system can also be compensated in addition to astigmatism corrections.

In this connection, a lens system in which the first partial lens system 26 focusses the light bundle 4 in an intermediate image plane 32 has proven particularly favorable. The entrance pupil 30 is situated in a location at which the raster scanning device 12 deflects the light bundle 4. Since two mirrors, the swiveling mirror 14 and the polygon mirror 16, are provided for deflection, this location is spatially expanded. Thus, there is a deflection in a determined spatial range which must be taken into account in configuring the optics according to FIG. 3 by adequately large dimensioning of the entrance pupil 30.

The first partial lens system 26 focusses the light bundle 4 entering the entrance pupil 30 on the intermediate image plane 32. Since the entrance pupil 30 is identical to the deflection area of the raster scanning device 12, a predetermined location is given on the intermediate image plane for every deflection angle. The second partial lens system 28, together with the annular mirror 18, then focusses the light bundle 4 on the projection surface 1 and transforms the location on the intermediate image plane into an angle again.

In the embodiment example shown in FIG. 3, the partial lens system 28 does not focus, but rather is so configured that the combined optical system formed of the second partial lens system 28 and the annular mirror 18 parallelizes the light bundle 4, since the embodiment example shown in FIG. 3 is used in connection with a very large dome. With smaller domes in a centric arrangement of the exit pupil of the optical system, including the annular mirror 8, focussing is advantageous for optimal resolution. However, a parallelizing of the light bundle 4 should be striven for outside of the center of smaller domes so that virtually the same picture point size is achieved in all areas of the projection surface.

The partial lens system shown in FIG. 3 offers the possibility of a simple optimization, since the focussing condition for the first partial lens system 26 and the second partial lens system 28 are predetermined individually. In addition, both partial lens systems 26 and 28 can be optimized jointly for color correction.

It is provided for the focussing conditions of the first partial lens system 26 that the entrance pupil 30 lies in the vicinity of its object-side principal focus or focal point and its second focal point fixes the intersection of the intermediate image plane 32 with the optical axis 6. For parallelizing the light bundle 4, the focal point of the entire system of partial lens system 2 and annular mirror 18 should likewise lie on the intermediate image plane 32. In principle, an afocal system is obtained, but one which differs from a conventional afocal system in that the position of the focal points of the first and second partial lens systems with the annular mirror 18 does not completely coincide on the intermediate image plane 32. The reason for this is that the raster scanning region in the entrance pupil 30 is spatially expanded and, further, the light bundle 4 is possibly also to be focussed on the projection surface 1.

Figure 4:
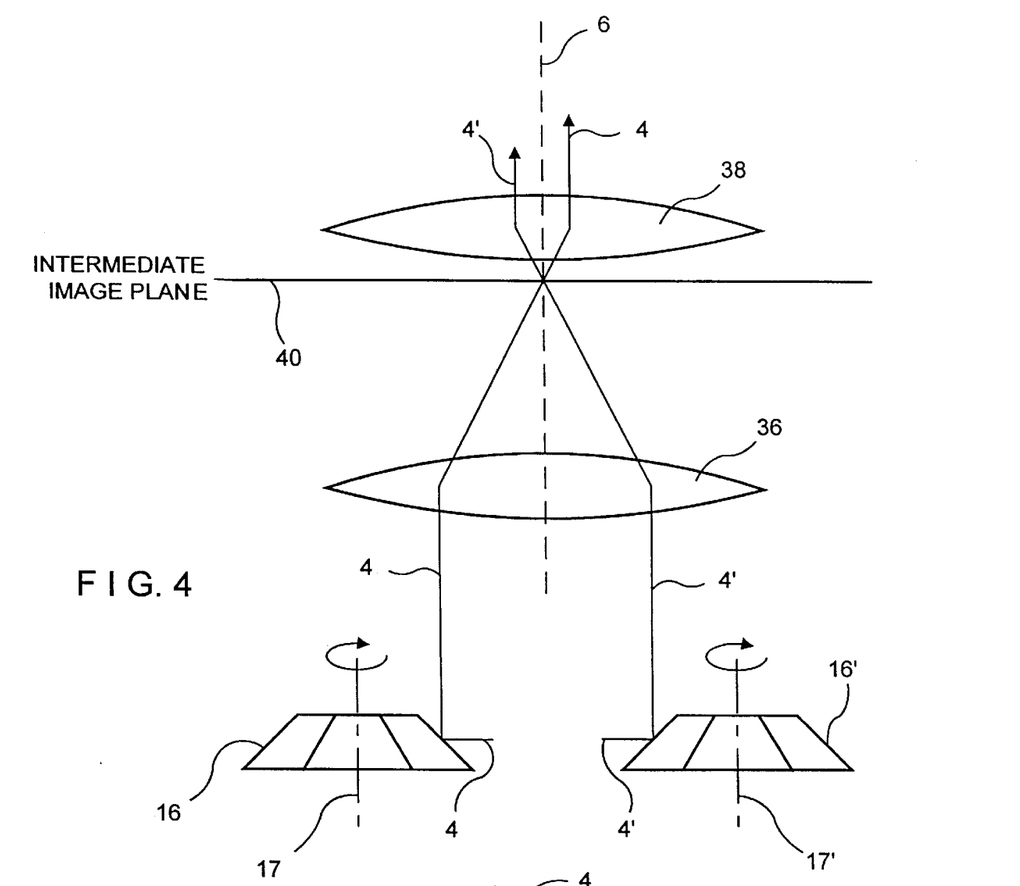
FIG. 4 is a schematic view of an embodiment example in which a plurality of raster scanning devices are used for dome projection.

With very large domes, it may be desirable to obtain a better resolution than is technically possible as a result of electronically induced switching speeds of the component elements in the control units 8 by reducing the picture points. The embodiment example of FIG. 4 can be used for an improvement of this kind. FIG. 4 shows only the essential parts of this further development. Annular mirrors and light control arrangements and optical elements were omitted from this figure.

In the embodiment example shown in FIG. 4, light bundles 4 and 4' emitted by different light sources 10 are deflected by two raster scanning devices, of which only its polygon mirrors 16 and 16' are shown. The deflected light bundles 4 and 4' are combined by an optical system formed of a first partial lens system 36 and a second partial lens system 38. This optical system is likewise a substantially afocal system with an intermediate image plane 40. It serves to combine locally the light bundles 4 and 4' reflected by the different polygon mirrors 16 and 16' so that they enter the entrance pupil 30 while originating from practically the same point. The focal point of the second partial lens system 38 then lies in the vicinity of the entrance pupil 30 in the embodiment example according to FIG. 3. The focal length of the second optical system 38 is less than that of the first optical system 36, so that the light bundles 4 and 4' exiting from the optical system lie closer together than those entering the optical system.

The simplified view in FIG. 4 shows only a reduction of the local distance between the light bundles 4, 4' by a factor of four. However, higher factors can also be selected by means of suitable focal length ratios of the partial lens systems 36 and 38, resulting in considerable latitude for the spatial arrangement of the two polygon mirrors 16 and 16', wherein, however, the diffraction limitation due to the partial lens systems 36 and 38 is to be taken into account.

The example shown in FIG. 4 was described thus far for an optical system located in front of the entrance pupil 30 of the embodiment example according to FIG. 3. However, it is also possible to configure the first partial lens system 26 and the second partial lens system 28 of FIG. 3 directly such that a sufficiently large entrance pupil results for the arrangement of a plurality of polygon mirrors 16 and 16' or other raster scanning devices.

Figure 5:
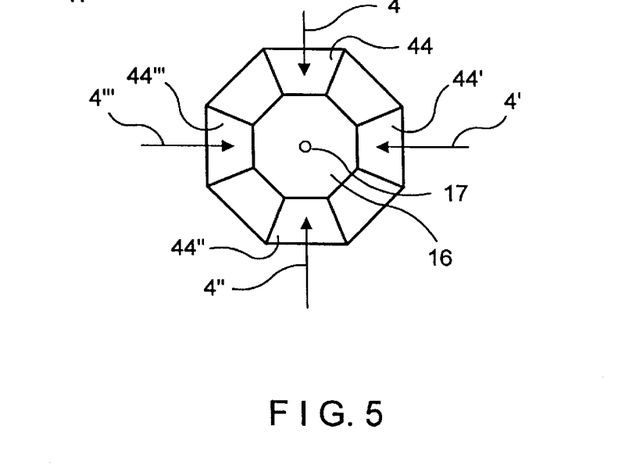
FIG. 5 shows a top view of a polygon mirror in which a plurality of polygon sides are used simultaneously for imaging.

A particularly simple and compact possibility for guiding a plurality of light bundles 4, 4', 4", 4''' in an individual entrance pupil according to Example 4 is given in the embodiment form shown in FIG. 5. FIG. 5 shows a top view of a polygon mirror in the shape of a truncated cone on which the light bundles 4, 4', 4", 4''' impinge on different coated polygon sides 44, 44', 44" and 44''' and are both deflected by the same polygon mirror 16. By means of this polygon mirror 16, the resolution, for example, in the latitude circles of the projection surface 1, can be quadrupled without a substantial increase in complexity. Each light bundle 4, 4', 4", 4''' is guided by the polygon mirror 16 to a quadrant of a parallel circle. Because of the individual polygon mirror 16 for four light bundles 4', 4", 4''', a synchronization of the deflection of different light bundles 4, 4', 4", 4''' is advantageously ensured in addition to the simplicity of construction when displaying the annular picture.

As was already made clear in the description of the example in FIG. 4, the raster scanning devices 12 for deflecting a plurality of light bundles should take up as little space as possible. In addition, it is required above all else that the parallel circles on the dome 2 can be scanned annularly. Therefore, instead of polygon mirrors, scanners for scanning rings can be arranged in the entrance pupil 30 in the embodiment example in FIG. 3 or in the entrance pupil of the optical system shown in FIG. 4 for deflecting the light bundle 4 as is shown by way of example in FIGS. 6 and 7.

Figure 6:
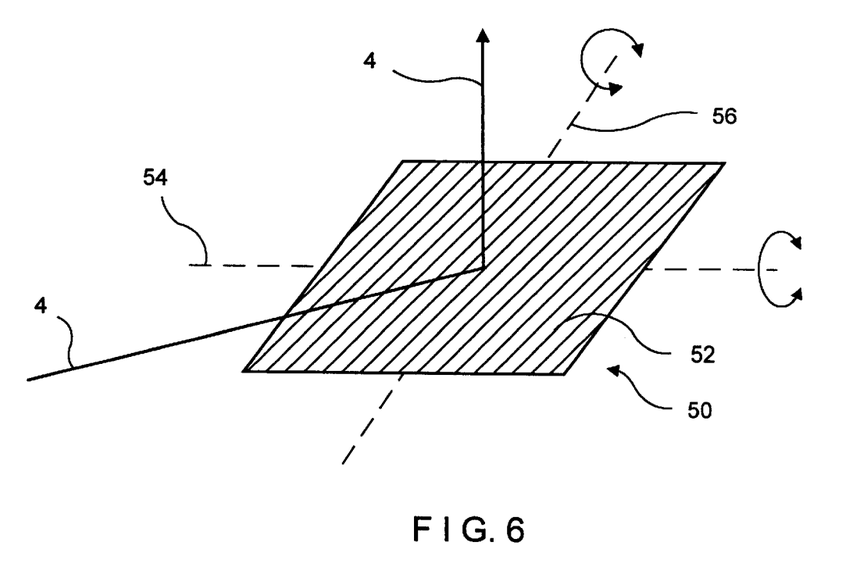
FIG. 6 shows an embodiment example for an annular mirror.

The scanner 50 for scanning rings shown in FIG. 6 has a mirror 52 which is supported so as to be rotatable about two axes 54 and 56. When controlling the axes with a sine-shaped or cosine-shaped oscillation of the same amplitude, an incident light bundle 4 is deflected in a circle when reflected at the mirror 52. By periodically changing the amplitude of the sine-shaped and cosine-shaped oscillation, a complete scanning can also be effected on an annular surface.

Since large deflecting angles can also be realized with the optical systems shown in FIG. 3 and FIG. 4, the desired deflecting area for the scanner 50 for scanning rings can be very small. Therefore, instead of stationary axes 54 and 56, piezo-crystals can also be arranged under all corners of the mirror 52 and controlled in phase with the generation of the aforementioned sine-shaped and cosine-shaped oscillation.

An annular scanner 50 of this kind can then be produced micromechanically, for example, which allows it to be integrated together with driving electronics on a common substrate. In this way, a compact component is formed for a plurality of scanners 50 for scanning rings which also finds room in an entrance pupil 30 measuring only several millimeters.

Because of the small dimensions which can be achieved in this embodiment form, possible disruptive effects can also be eliminated by exciting oscillations on the surface of the mirror 50 in that the latter is dimensioned in such a way that its resonant frequency conforms to the excitation frequency, for example, when the piezo-crystals controlling the tilting are simultaneously used as oscillators for generating the line frequency when raster scanning.

Figure 7:
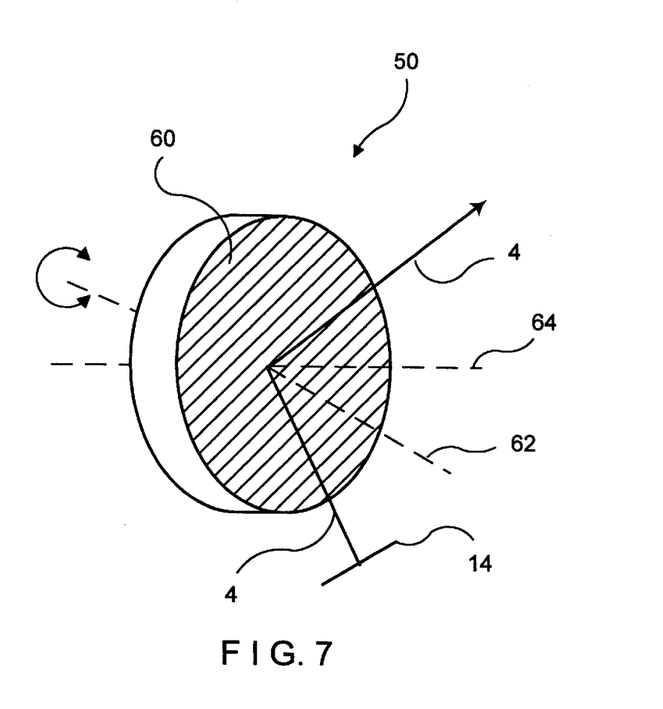
FIG. 7 shows another embodiment example for an annular mirror.

The embodiment example shown in FIG. 7 likewise has a swiveling mirror 14, but a rotating mirror 60 is used instead of the polygon mirror 16. However, in this case, the axis of rotation 62 is tilted by an angle other than zero relative to its surface normal 64, so that the exiting light bundle 30 describes an ellipse during the rotation of the plane mirror 60 in conformity to the laws of reflection. With a suitable convexity of the mirror and/or of subsequent optics, however, the ellipse can be changed into a circle. The radius of the circle generated by deflection can be changed by the swiveling mirror 14. However, it is also possible to vary the axis 62 relative to the surface normal 64, wherein the swiveling mirror 14 can then be dispensed with.

Figure 8:
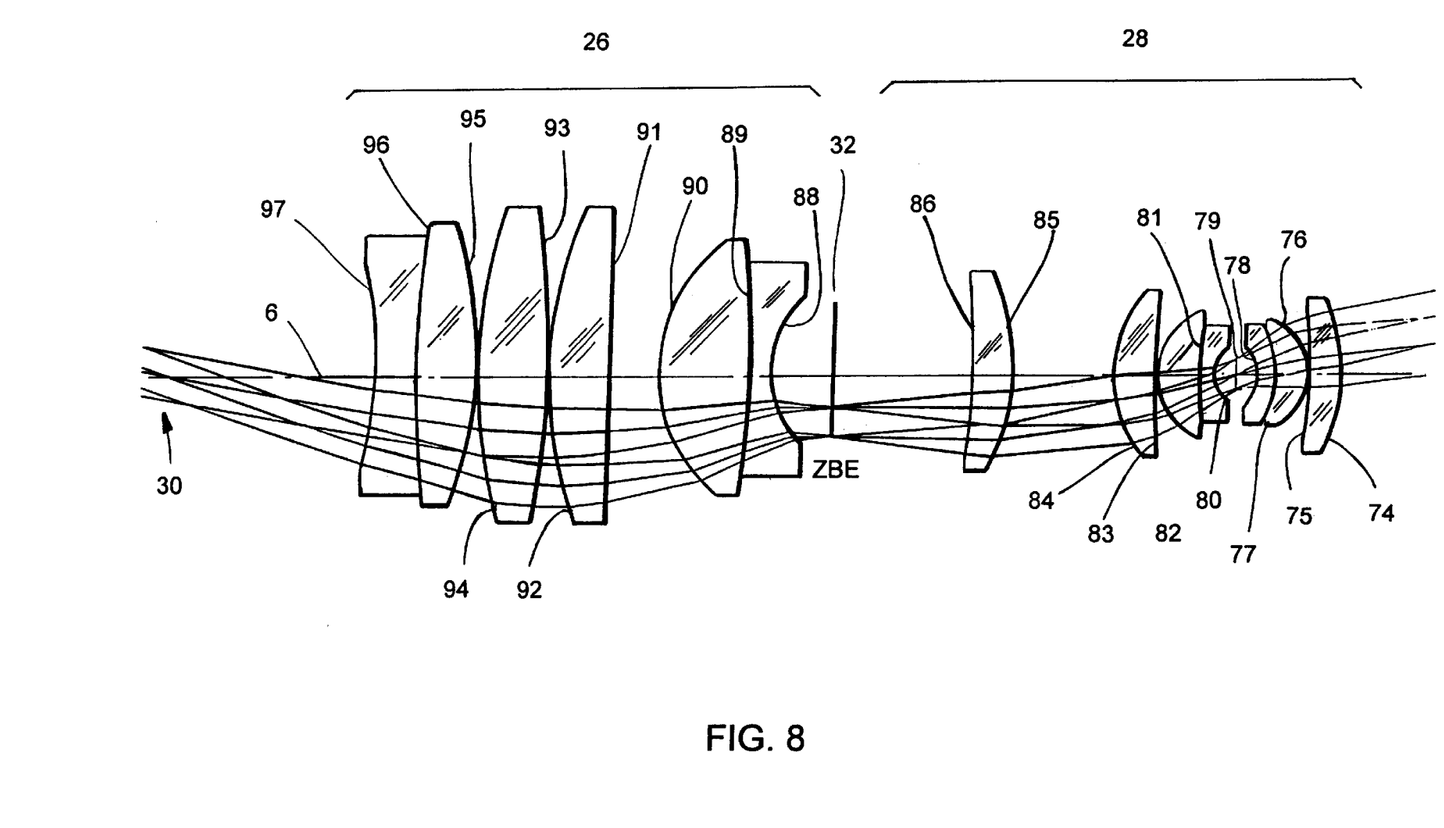
FIG. 8 is a schematic view of an optimized optical system whose dimensions are indicated in the following part of the description and in the tables.

An optical system according to the embodiment example in FIG. 3 is indicated in detail in FIG. 8. The reference numbers of the lens surfaces indicated in FIG. 8 are listed in the accompanying Table I as are the distances and refractive indexes at different wavelengths of the glasses used in the production of the lenses.

The entrance pupil 30 in the embodiment example in FIG. 8 lies at a distance of 24.2 mm from the lens surface 97. The entrance pupil 30 measured approximately 5 mm.

The vertex of the hyperboloid 18 was arranged at a distance of 110 mm from the lens surface 74. The radius of curvature ρ at the vertex was 25 mm. The surface of the hyperbola can be expressed by the following known formula:

$$z = \frac{\rho \cdot h^2}{1 + \sqrt{1 - (1+k) \cdot \rho^2 h^2}}$$

where k represents the conic section parameter which was set at a value of −1.2 in the embodiment example. At a given distance z from the vertex on the optical axis, the equation gives the functional relationship with width h vertical to the optical axis 6 which reproduces the shape of the hyperboloid.

Taking this data into account with the dimensions specified in Table I gives the relationship, also indicated in the accompanying Table II, between the angle of incidence and the projection angle on the dome. As can be seen from Table II, a large dome area of 40 angular degrees can be covered. Unexpectedly, the functional relationship between the angle of incidence, that is, the deflection angle of the raster scanning device 12, and the angle at the dome is extensively linear, so that only a small effort need be expended on correction with respect to picture distortions for faithfully displaying the picture on the dome.

A correction for rectification is effected by means of image processing in the control unit 8 shown in FIG. 8 containing a computer with an arithmetic unit. The planetarium data are already stored on the fixed disk of this computer so as to take into account the distortion by the annular mirror 18 and the dome geometry. The projection images entered in the control unit 8 are suitably prepared by the computer immediately after being entered and written to the fixed disk so that the computing time for rectification is minimized.

| Reference number | Radius of curvature mm | Intermediate space reference number | Distance mm | Index of refraction at 546 nm | Index of refraction at 480 nm | Index of refraction at 644 nm |
|---|---|---|---|---|---|---|
| 74 | 17.176 | 74–75 | 3.0 | 1.7162 | 1.723 | 1.7096 |
| 75 | 37.738 | 75–76 | 0.2 | 1 | 1 | 1 |
| 76 | 5.831 | 76–76 | 3.0 | 1.7162 | 1.7230 | 1.7096 |
| 77 | 7.906 | 77–78 | 2.0 | 1.8127 | 1.8297 | 1.7975 |
| 78 | 3.866 | 78–79 | 2.13 | 1 | 1 | 1 |
| 79 | focus | 79–80 | 2.13 | 1 | 1 | 1 |
| 80 | −3.041 | 80–81 | 1.5 | 1.8127 | 1.8297 | 1.797 |
| 81 | −29.124 | 81–82 | 4.0 | 1.7162 | 1.7230 | 1.7096 |
| 82 | −6.784 | 82–83 | 0.2 | 1 | 1 | 1 |
| 83 | −76.506 | 83–84 | 4.0 | 1.7162 | 1.7230 | 1.7096 |
| 84 | −12.873 | 84–85 | 10.0 | 1 | 1 | 1 |
| 85 | 21.870 | 85–86 | 4.0 | 1.7162 | 1.7230 | 1.7096 |
| 86 | 80.974 | 86-IIP | 13.5 | 1 | 1 | 1 |
| 32 | IIP[*] | IIP-88 | 6 | 1 | 1 | 1 |
| 88 | −10.238 | 88–89 | 2.0 | 1.8127 | 1.8297 | 1.7975 |
| 89 | 93.146 | 89–90 | 9.0 | 1.6539 | 1.6599 | 1.6482 |
| 90 | −15.901 | 90–91 | 5.07 | 1 | 1 | 1 |
| 91 | 1288.435 | 91–92 | 6.0 | 1.6539 | 1.6599 | 1.6482 |
| 92 | −39.945 | 92–93 | 0.2 | 1 | 1 | 1 |
| 93 | 93.635 | 93–94 | 7.0 | 1.6539 | 1.6599 | 1.6482 |
| 94 | −50.460 | 94–95 | 0.2 | 1 | 1 | 1 |
| 95 | 40.324 | 95–96 | 6.0 | 1.6539 | 1.6599 | 1.6482 |
| 96 | −99.574 | 96–97 | 4.0 | 1.8127 | 1.8297 | 1.7975 |
| 97 | 46.755 | | | | | |

[* IIP = Intermediate Image Plane]

TABLE 2

| angle of incidence | angle at dome |
|---|---|
| 9.61° C. | −20° C. |
| 10.47° C. | −15° C. |
| 11.38° C. | −10° C. |
| 12.34° C. | −5° C. |
| 13.36° C. | 0° C. |
| 14.45° C. | 5° C. |
| 15.61° C. | 10° C. |
| 16.87° C. | 15° C. |
| 18.23° C. | 20° C. |

What is claimed is:

1. A device for generating a partial annular or an annular picture on a portion of a spherical projection surface by an annular mirror by which a light bundle generating this picture can be deflected onto the projection surface, comprising:

a light source by which substantially parallel light bundles can be generated;

a control unit for controlling the intensity of the light bundle; and a raster scanning device which is arranged in the light path between the annular mirror and the light source and which can raster scan the light bundle in two dimensions for the sequential illumination of picture points of the partial annular or annular picture.

2. The device according to claim 1, wherein the annular mirror is a partial surface of a hyperboloid.

3. The device according to claim 1, wherein an optical system for parallelizing or focussing on the projection surface the light bundle proceeding from the annular mirror is provided between the raster scanning device and the annular mirror.

4. The device according to claim 3, wherein the annular mirror is constructed on an annular mirror lens associated with the optical system on the side remote of the raster scanning device.

5. The device according to claim 4, wherein the side of the annular mirror lens facing the raster scanning device is a spherical surface.

6. The device according to claim 3, wherein the optical system has two partial lens systems and the raster scanning device is arranged, by its area in which the light bundle can be deflected, in an entrance pupil of the first partial lens system, wherein the light bundle can be imaged by the first partial lens system in an intermediate image plane, and in that the second partial lens system, together with the annular mirror, parallelizes the light bundles arriving from the intermediate image plane or focusses them on the projection surface.

7. The device according to claim 6, wherein a plurality of light sources and a plurality of associated raster scanning devices for deflecting the light bundles emitted by these light sources are provided, and in that the entrance pupil comprises the areas in which the light bundles of the light bundles proceeding from the plurality of light sources can be deflected by the raster scanning devices.

8. The device according to claim 6, wherein a plurality of light sources is provided, in that a raster scanning device has a rotatable polygon mirror for scanning which has a plurality of coated polygon sides for deflection, and the light bundles of different light sources are directed to a plurality of these polygon sides.

9. The device according to claim 3, wherein the optical system is color-corrected in the wavelength range from 520 nm to 670 nm.

10. The device according to claim 1, wherein the raster scanning device has a scanner for scanning rings.

11. The device according to claim 1, wherein the control unit for controlling intensity has an arithmetic unit, especially inside a computer, for preparing the image data for rectifying the annular picture shown by this device.

12. The device according to claim 1, wherein the light source has at least one laser.

* * * * *